United States Patent
Posse et al.

(10) Patent No.: US 11,676,109 B2
(45) Date of Patent: Jun. 13, 2023

(54) INCREASING DIMENSIONALITY OF DATA STRUCTURES

(71) Applicant: Google LLC, Mountain View, CA (US)

(72) Inventors: Christian Posse, Belmont, CA (US);
Pei-Chun Chen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 148 days.

(21) Appl. No.: 16/750,130

(22) Filed: Jan. 23, 2020

(65) Prior Publication Data

US 2020/0160275 A1  May 21, 2020

Related U.S. Application Data (62) Division of application No. 15/228,662, filed on Aug. 4, 2016, now Pat. No. 10,579,968.

(51) Int. Cl.
*G06Q 10/1053* (2023.01)

(52) U.S. Cl.
CPC ............... *G06Q 10/1053* (2013.01)

(58) Field of Classification Search
CPC ............ G06Q 10/1053; G06Q 10/105
See application file for complete search history.

(56) References Cited

U.S. PATENT DOCUMENTS

| | | | |
|---|---|---|---|
| 5,197,004 A | 3/1993 | Sobotka et al. | |
| 6,728,695 B1 | 4/2004 | Pathria et al. | |
| 6,874,002 B1 | 3/2005 | Peleus et al. | |
| 8,117,024 B2 | 2/2012 | Dane | |
| 8,244,551 B1 * | 8/2012 | Mund | G06Q 10/10 705/1.1 |
| 2002/0198766 A1 | 12/2002 | Magrino et al. | |
| 2006/0229896 A1 | 10/2006 | Rosen et al. | |
| 2008/0086366 A1 * | 4/2008 | Concordia | G06Q 10/06 434/219 |

(Continued)

OTHER PUBLICATIONS

Raymond J. Mooney and Razvan Bunescu. 2005. Mining knowledge from text using information extraction. SIGKDD Explor. Newsl. 7, 1 (Jun. 2005), 3-10. DOI:https://doi.org/10.1145/1089815.1089817 (Year: 2005).*

(Continued)

*Primary Examiner* — Carrie S Gilkey
(74) *Attorney, Agent, or Firm* — Brake Hughes Bellermann LLP (57) ABSTRACT

Methods, apparatus, systems, and computer-readable media are provided for increasing dimensionality of data structures associated with filling positions. In some implementations, a prediction of desired experience for a given position to be filled may be used to increase the dimensionality of a searchable data structure that represents the given position. For example, the predicted desired experience may be incorporated into a searchable field of the data structure. Among other things, increasing the dimensionality of the data structure may facilitate more granular searching of positions and guided creation of new positions to be filled. In some implementations, a predicted desired experience may be used to notify a user posting a new position whether a specified desired experience corresponds to a predicted desired experience.

20 Claims, 8 Drawing Sheets

(56) References Cited

U.S. PATENT DOCUMENTS

| | | |
|---|---|---|
| 2014/0074738 A1 | 3/2014 | Thankappan et al. |
| 2014/0108308 A1 | 4/2014 | Stout et al. |
| 2016/0125361 A1 | 5/2016 | Vivas et al. |
| 2016/0132833 A1* | 5/2016 | Obeid .................. G06Q 10/105 705/321 |
| 2016/0162779 A1 | 6/2016 | Marcus et al. |
| 2017/0154311 A1* | 6/2017 | Lewis ................ G06Q 10/1053 |
| 2017/0344556 A1* | 11/2017 | Wu .................... G06Q 10/1053 |

OTHER PUBLICATIONS

Nahm et al. "Using Information Extraction to Aid the Discovery of Prediction Rules from Text." Proceedings of the Sixth International Conference on Knowledge Discovery and Data Mining (KDD-2000) Workshop on Text Mining. 2000. 8 pages. 2000.

Wanarsup, P. et al. "Intelligent Personalization Job Web Site" 2008 Ninth ACIS International Conference on Software Engineering, Artificial Intelligence, Networking, and Parallel/Distributed Computing; pp. 959-964; 2008 2008.

* cited by examiner

INCREASING DIMENSIONALITY OF DATA STRUCTURES

BACKGROUND

It may be desirable to fill positions with candidates having various types of desired experience. Additionally, candidates seeking to fill positions may wish to know what experience is desired to fill a given position, so that the candidates do not waste time or resources pursuing positions for which the candidates are not qualified. However, many position announcements may lack a clear indication of desired experience. Consequently, candidates searching a database of positions to fill may be presented with positions for which they are under or over qualified.

SUMMARY

The present disclosure is generally directed to methods, apparatus, and computer-readable media (transitory and non-transitory) for increasing dimensionality of data structures associated with filling positions. In some implementations, a prediction of desired experience for a given position to be filled may be used to increase the dimensionality of a searchable data structure that represents the given position. For example, the predicted desired experience may be incorporated into a searchable field of the data structure. Increasing the dimensionality of data structures representing positions to be filled may increase the accuracy of search results presented to candidates searching those structures. Increasing the accuracy of search results may reduce the number of searches performed by candidates. Reducing the number of searches performed may conserve various computing resources of one or more computers that provide a searchable database of positions to be filled. Moreover, network traffic may be reduced.

In some implementations, desired experience predicted for a position to be filled may be used as a point of reference for a user posting the position, e.g., so that they can see whether a desired experience they specify explicitly conforms to desired experiences typically associated with similar positions. For example, various data points specified for the position to be filled, such as job title, location, salary, skills, education, company, benefits, and so forth, may be used to match the position to be filled with other similar positions (to be filled or already filled). These other similar positions may then be used to predict one or more data points for the position to be filled, such as a desired experience. If the predicted desired experience conflicts with the explicitly-specified desired experience, the user may be notified of the discrepancy, so that the user can amend the desired experience accordingly. Guiding users in this fashion may yield more granular (or higher dimensionality) announcements of positions to be filled. This in turn may yield one or more of the technical advantages described above.

In some implementations, a corpus of positions may be analyzed, e.g., to train a text-based classifier that uses pattern recognition and/or other natural language processing techniques to identify expressions of various data points, such as desired experience. The classifier may be configured to extract patterns such as numeric ranges (e.g., preceded or followed by a particular skill), qualifiers (e.g., "at least," "must have," "minimum of," "preferred," "required," "is OK," etc.), and other similar patterns.

Once the text-based classifier is trained, another so-called "experience" classifier may be trained to identify relationships between various data points (e.g., position titles and/or company names) and desired experiences. That way, when a user creates a new position to be filled that includes a data point such as a position title, the position title can be used (alone or in combination with other data points such as company name, company size, education requirements, compensation, location, etc.) by the second classifier to predict a desired experience for the new position to be filled, regardless of whether the user explicitly specified a desired experience. Additionally or alternatively, when a searching candidate submits a search query specifying a particular desired experience, at least some responsive positions may be matched to the query based on associated predicted desired experiences. In some implementations, when the candidate is presented with positions responsive to a search query, an indication of predicted desired experience may be provided with each responsive position. In some implementations, predicted desired experience may or may not be visually distinguished in a user interface from desired experiences that were explicitly provided at the time the respective positions were posted.

Techniques described herein may provide for a number of technical advantages in addition to or instead of those already mentioned. In some cases, employing techniques described herein may reduce or eliminate noise typically found among position postings, leading to more accurate (and hence, less) searches by candidates. Meaningless and/or otherwise irrelevant information such as "to join a dynamic team," a location, trailing dots, salary, work schedule information, etc., may be removed or at least set aside from other more pertinent information, such as desired experience. Moreover, as additional positions are added to corpuses, and particularly where those positions include explicitly-defined desired experiences, it is possible to continuously "learn" new information to make better predictions.

In some implementations, techniques described herein may facilitate searching based on desired experience that is not limited to keyword matching. Furthermore, techniques described herein may allow positions with no explicitly-defined experience requirements to be found in searches. Techniques described herein may further enable search results to be filtered by robust experience levels. In some cases, predicted desired experiences may be conspicuously displayed within search results, preventing position seekers from having to spend time digging into individual position descriptions to learn whether they have the desired experience.

In some implementations, a computer implemented method may be provided that includes the following operations: receiving, via one or more network interfaces from a remote computing device, new position information provided at a user interface operating on the remote computing device, wherein the new position information specifies one or more candidate qualifications for filling a new position; generating, in memory based on the new position information, a new data structure to represent the new position; increasing a dimensionality of the new data structure; storing the new data structure in association with a searchable corpus of positions; receiving, via one or more of the network interfaces from a computing device operated by a candidate, a search query seeking positions associated with a specified desired experience; identifying responsive positions in the searchable corpus of positions based on the specified desired experience, wherein the responsive positions include the new position; generating data to render a search result presentation interface that presents the responsive positions; and delivering, via one or more of the network interfaces, the data to the computing device operated by the candidate. In various implementations, increasing the dimensionality may include: identifying at least a subset of a corpus of positions based on the one or more candidate qualifications, wherein each position of the corpus of positions is represented by a data structure stored in memory; predicting a desired experience for filling the new position based on the subset of the corpus of positions; and incorporating the predicted desired experience into a searchable field of the new data structure.

This method and other implementations of technology disclosed herein may each optionally include one or more of the following features.

In various implementations, the search result presentation interface may present the predicted desired experience associated with the new position in a visually distinct style from one or more explicitly-defined candidate qualifications. In various implementations, the method may include ranking the responsive positions based on desired experiences associated with the respective responsive positions, wherein the search results interface presents the responsive positions in ranked order. In some implementations, the ranking further includes ranking the new position lower than one or more other responsive positions based on the one or more other responsive positions being associated with respective desired experiences that are explicitly-defined. In other implementations, the ranking further includes ranking the new position higher than one or more other responsive positions based on the one or more other responsive positions being associated with respective desired experiences that are explicitly-defined.

In various implementations, the new data structure may include one or more database entries. In various implementations, the desired experience may be predicted based on relationships between one or more other data points extracted from the subset of the corpus of positions and desired experiences extracted from the subset. In various implementations, the one or more other data points may include a position title. In various implementations, the subset of the corpus of documents may be identified based at least in part on a position title specified in the new position information. In various implementations, the corpus of documents and the searchable corpus of documents may be the same corpus.

In another aspect, a method may include the following operations: receiving new position information provided at a user interface by a user, wherein the new position information specifies candidate qualifications for filling a new position, and wherein the candidate qualifications for filling the new position include a specified desired experience; identifying at least a subset of a corpus of positions based on at least some of the candidate qualifications; predicting a desired experience for filling the new position based on the subset of the corpus of positions; determining that there is a conflict between the predicted desired experience and the specified desired experience; and causing the user interface to present a notification of the conflict to the user.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
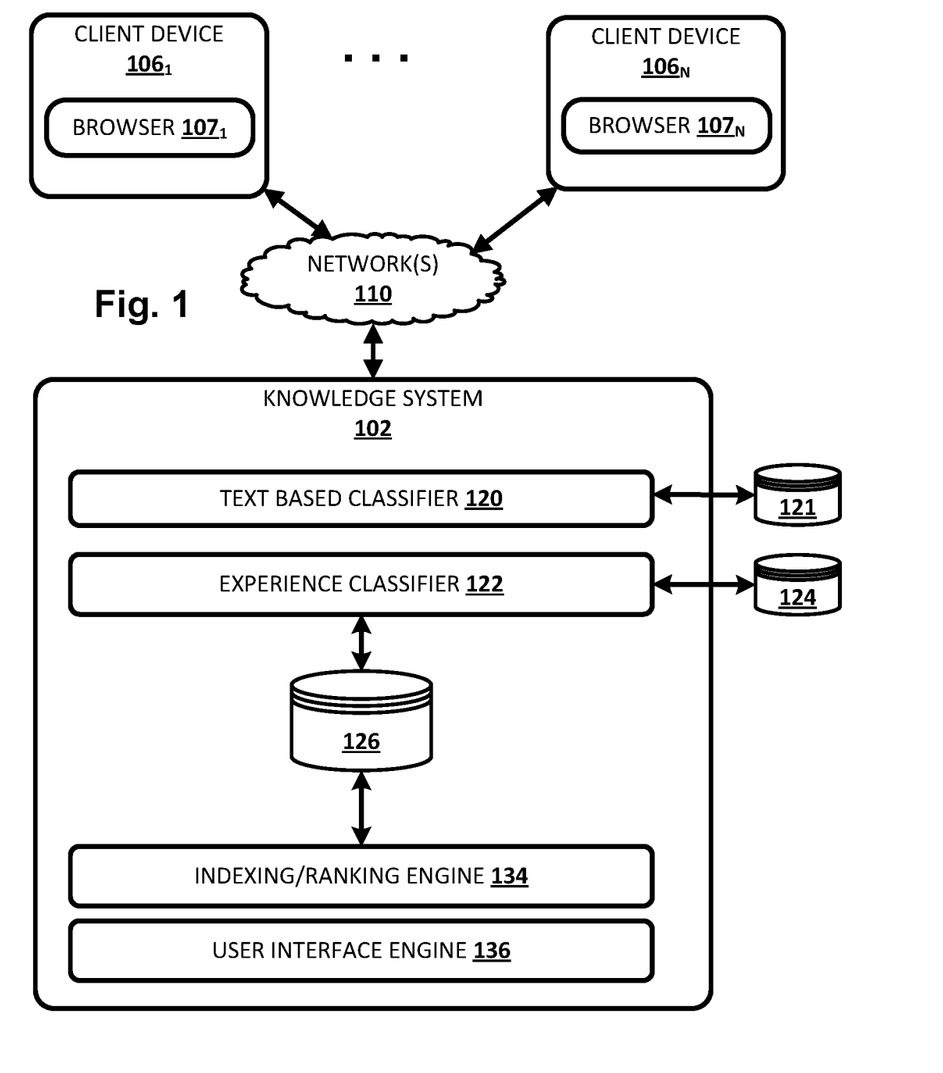
FIG. 1 illustrates an environment in which various aspects of the present disclosure may be implemented, in accordance with various implementations.

FIG. 1 illustrates an environment in which dimensionality of data structures associated with filling positions may be increased. The example environment includes a plurality of client devices $106_{1-N}$ and a knowledge system 102. Knowledge system 102 may be implemented in one or more computers that communicate, for example, through a network. Knowledge system 102 is an example of an information retrieval system in which the systems, components, and techniques described herein may be implemented and/or with which systems, components, and techniques described herein may interface.

One or more users may interact with knowledge system 102 via one or more client devices 106. Each client device 106 may be a computer coupled to the knowledge system 102 through one or more networks 110 such as a local area network (LAN) or wide area network (WAN) such as the Internet. Each client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided.

Each client device 106 and knowledge system 102 may include one or more memories for storage of data and software applications, one or more processors for accessing data and executing applications, and other components that facilitate communication over a network. The operations performed by one or more client devices 106 and/or knowledge system 102 may be distributed across multiple computer systems. Knowledge system 102 may be implemented as, for example, computer programs running on one or more computers in one or more locations that are coupled to each other through a network.

Each client device 106 may operate a variety of different applications. For the sakes of brevity and simplicity, only a browser 107 is depicted in FIG. 1, but it should be understood that users may interact with knowledge system 102 using any number of client applications, including but not limited to propriety employment applications, email clients, file transfer clients (e.g., FTP, cloud drives, etc.), and so forth.

In various implementations, knowledge system 102 may include a text based-classifier 120, an experience classifier 122, an indexing/ranking engine 134, and a user interface engine 136. In some implementations one or more of components 120, 122, 134, and/or 136 may be omitted. In some implementations all or aspects of one or more of components 120, 122, 134, and/or 136 may be combined. In some implementations, one or more of components 120, 122, 134, and/or 136 may be implemented in a component that is separate from knowledge system 102. In some implementations, one or more of components 120, 122, 134, and/or 136, or any operative portion thereof, may be implemented in a component that is executed by client device 106.

Text-based classifier 120 may be trained and/or otherwise configured to use techniques such as natural language processing, pattern recognition, neural networks, heuristics, machine learning, etc., to identify and extract expressions of desired experience from documents such as new positions postings (e.g., job postings, help wanted postings, etc.). In some implementations, text-based classifier 120 may be trained on a corpus of position postings. These position postings may include active (e.g., not yet filled) and/or inactive (e.g., filled previously but nonetheless useful as a source of data points) positions.

Text-based classifier 120 may be configured to identify various types of expressions or phrases within documents, new position postings, and/or search queries that are suggestive of various data points, such as desired and/or required experience. Examples of expressions that text-based classifier 120 may be configured to handle include, but are not limited to, "x-y years of experience," where "x" and "y" are numerical expressions (e.g., 0, 1, 2.5, 4, etc.), "z year(s) of experience" where "z" is a number spelled-out or numerical number (one, two, 1, 2, etc.), "x to y year(s) working experience" where "x" and "y" are either numerical expressions or spelled-out numbers, "x+ years of experience" where "x" is a numerical expression or spelled out number, "x year(s) of <skills> required/desired" where "x" is a numerical expression or spelled-out number, and <skill> denotes any ability required for the job, that is a skill, field of study/knowledge, occupation, software application, etc. In some implementations, text-based classifier 120 may be configured to identify/extract qualifiers such as, but not limited to, "at least," "must have," "minimum of," "preferred," "required," "is ok" (e.g. "one year experience or less is ok"), and so forth. In some implementations, text-based classifier 120 may be configured to handle negative expressions as well, such as expressions indicating that no experience is required. In some implementations, text-based classifier 120 may store rules, heuristics, and/or machine learning data it uses to extract expressions of desired experience in index 121, although this is not required.

Experience classifier 122 may be configured to use various techniques (e.g., machine learning, neural networks, logistical regression, heuristics, etc.) to identify relationships between one or more data points associated with position postings, such as position titles and explicitly-defined desired experiences associated with those titles. In some implementations, experience classifier 122 may be trained using a corpus of position postings, which may be the same corpus as was used to train text-based classifier 120 and/or a different corpus. In some implementations, experience classifier 122 may be further trained using data from other sources, including but not limited to government agencies such as the United States Bureau of Labor Statistics. Experience classifier 122 may therefore be trained to identify relatively granular distributions of experience required and/or desired for a plurality of positions to be filled. In some implementations, these distributions may be segmented into meaningful ranges, such as no experience required, 0-1 year, 1-2 years, 2-3 years, 3-5 years, and so forth. In some implementations, experience classifier 122 may store data and/or rules it uses/learns in index 124, though this is not required.

In some implementations, experience classifier 122 may utilize the distributions of experience required/desired for various positions to calculate a most plausible desired experience. Desired experience may be measured using various metrics, including but not limited to an average, median, quartiles, and/or or mode. In some implementations, ranges of desired experience may be determined to further convey desired experience diversity in a job posting. Examples of ranges may include but are not limited to minimum-maximum experience, interquartile range, and so forth. In various implementations, experience classifier 122 may compute distributions of desired experience for each position to be filled based on an entire job posting repository, a repository partitioned by relevant dimension (e.g. industry, company size, location), and so forth.

Indexing/ranking engine 134 may maintain an index 126 of one or more corpuses of positions for use by knowledge system 102. Indexing/ranking engine 134 processes documents and updates index entries in index 126, for example, using conventional and/or other indexing techniques. For example, indexing/ranking engine 134 may receive information related to one or more positions from one or more resources such as employers posting job opportunities and/or position candidates posting resumes, and may index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript).

Indexing/ranking engine 134 may use the index 126 to identify responsive positions and other information responsive to a search query, for example, using conventional and/or other information retrieval techniques. Indexing/ranking engine 134 may calculate scores for the responsive positions and other information identified as responsive to a search query, for example, using one or more ranking signals. Each ranking signal may provide information about the responsive position or information itself, the relationship between the responsive position or information and the search query, and/or the relationship between the responsive or information and the candidate performing the search.

In this specification, the term "database" and "index" will be used broadly to refer to any collection of data. The data of the database and/or the index does not need to be structured in any particular way and it can be stored on storage devices in one or more geographic locations. Thus, for example, the indices 121, 124, and 126 may include multiple collections of data, each of which may be organized and accessed differently.

User interface engine 136 may be configured to generate data to render a search result presentation interface that presents the responsive positions identified by indexing/ranking engine 134. For example, in some implementations, user interface engine 136 may generate a document that includes responsive data conveyed using one or more markup languages such as the Hypertext Markup Language ("HTML") or the Extensible Markup Language ("XML"). In other implementations, user interface engine 136 may organize the responsive positions into a deliverable data package having a format such as a comma-separated values ("CSV") or values delimited with other characters (e.g., tabs, colons, semicolons, etc.). In various implementations, user interface engine 136 may deliver, e.g., via networks 110, the generated data to a client device 106 operated by the searching candidate.

Figure 2:
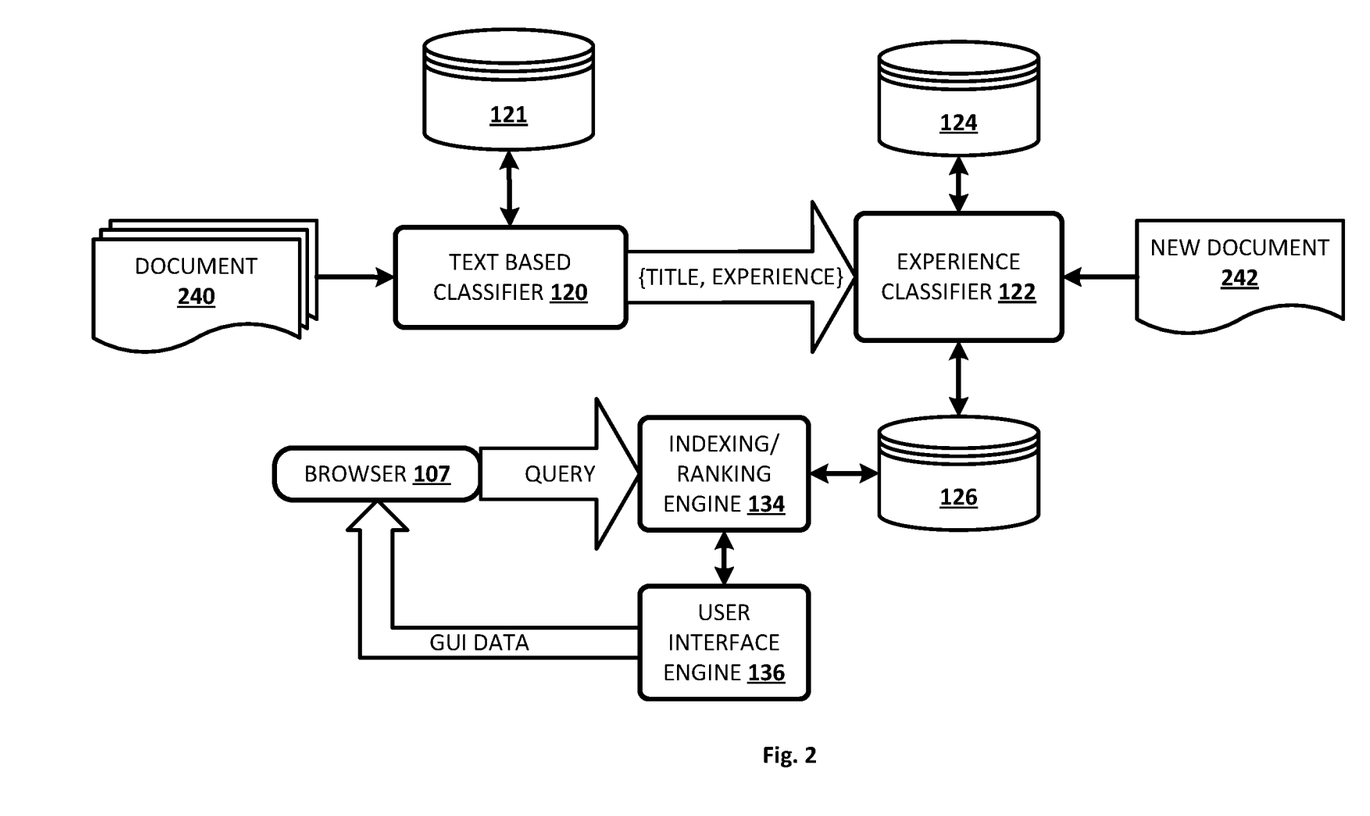
FIG. 2 depicts an example of how data may flow between various components described herein, in accordance with various implementations.

Referring now to FIG. 2, an example is depicted of how data may flow between various components of FIG. 1 at various stages, in accordance with various implementations. A corpus of documents 240 may be provided to text-based classifier 120. Text-based classifier 120 may be trained on these documents 240 as described above, and may store rules, heuristics, machine learning statistics/data, and other information it learns in index 121. In some implementations, text-based classifier 120 may "normalize" and/or segment data points that may vary among documents, as well as remove data that may or may not be pertinent to predict particular data points (e.g., desired experience). As a non-limiting example, text-based classifier 120 may clean the job title "full-time software engineer in Mountain View" to simply read, "software engineer." Additionally or alternatively, text-based classifier 120 may normalize multiple different job titles that represent otherwise similar positions into a single title. For example, the job titles "Software Architect," "Software Engineer,", and "Software Planner" may be normalized into "software engineer." This may avoid the sparsity caused by having too many different titles with only a few positions associated with each. It may also improve the ability of experience classifier 122 to generate meaningful statistics.

In some implementations, text-based classifier 120 may provide data it extracts to experience classifier 122. Experience classifier 122 may be trained to identify relationships between various data points extracted from documents 240. In FIG. 2, for instance, text-based classifier 120 provides pairs of job titles and corresponding desired experience to experience classifier 122. Based on these pairs, and perhaps on other data points from documents 240 and/or other external sources (e.g., Bureau of Labor Statistics data, not depicted), experience classifier 122 may be trained to predict, based on newly-received documents 242 (or more generally, on new position postings), various data points that may or may not have been explicitly provided in the new documents 242. Of course, this is not meant to be limiting. In various implementations, experience classifier 122 may be trained to identify relationships between other data points and desired experience, such as any combination of age, location, education, expected compensation, benefits, prior positions held, and so forth.

For example, for a given position title (or any colorable variations thereof, or for another given data point other than position titles), experience classifier 122 may increase a dimensionality of a new data structure created with features extracted from the new document 242. Such a data structure may include, for instance, one or more associated database records or other structures stored in memory of one or more computing devices forming part of knowledge system 102. Increasing dimensionality may include, in some implementations, identifying at least a subset of a corpus of positions (e.g., stored in index 126 and representing positions conveyed by documents 240) based on one or more candidate qualifications contained in new document 242. Experience classifier 122 may predict a data point such as a desired experience for filling the new position represented by new document 242 based at least in part on the subset of the corpus of positions.

Experience classifier 122 may then incorporate the predicted desired experience into a searchable field of the new data structure. In some implementations, new document 242 and/or the new data structure may be stored in index 126, in some cases alongside similar data structures representing documents 240 (though this is not required). In some implementations, experience classifier 122 may populate an indexed database field with the predicted desired experience. Additionally or alternatively, experience classifier 122 may annotate new document 242 when new document 242 with the predicted desired experience is stored in index 126.

Once new document 242 (and other documents like it) is stored and/or otherwise represented in index 126 with annotations and/or database fields populated with desired experience, subsequent users such as candidates seeking to fill positions may search index 126 for applicable positions. For example, in FIG. 2, a candidate seeking employment may operate browser 107 to submit a search query to indexing/ranking engine 134. In some instances, the search query may include a specified desired experience. For example, a candidate may search for "software engineers requiring 5-10 years of experience." Indexing/ranking engine 134 may search data structures and/or documents stored in index 126 to identify positions responsive to the search query. Once responsive positions are identified, user interface engine 136 may generate data (e.g., HTML, XML, etc.) to render, e.g., in browser 107, a search result presentation interface that presents the responsive positions. User interface engine 136 may then deliver the data to browser 107 operating on the computing device (e.g., 106) operated by the candidate.

Figure 3:
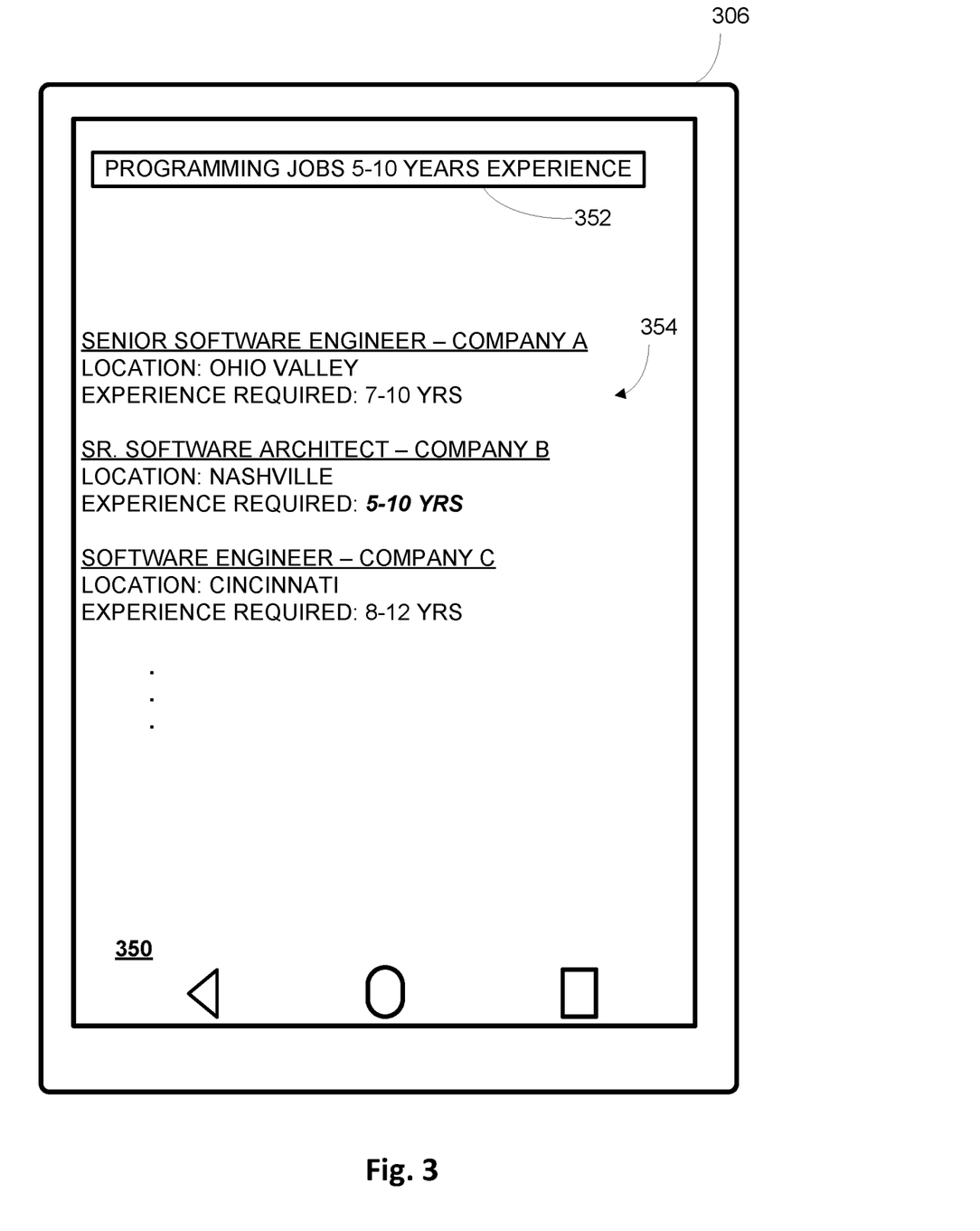
FIG. 3 depicts one example of an interface that may be presented to a candidate searching for positions to fill, in accordance with various implementations.

FIG. 3 depicts on non-limiting example of what a candidate might see when they search positions to be filled, in accordance with various implementations. In this example, a client device 306 takes the form of a tablet computer or smart phone with a touch screen display 350, but other types of computing devices may be used by position-seeking candidates to perform searches. In this example, the searching candidate has entered, into a search field 352, the search query "programming jobs 5-10 years' experience." Responsive results 354 are depicted below search field 352.

In this example, the phrase "programming jobs" contained in the search query has been normalized, e.g., by text-based classifier 120 or another component, to a perhaps more standard title such as "software engineer" derived from a plurality of positions, e.g., contained in index 126. Of course this is just an example, and other, different normalizations are possible. In addition, the specified experiences provided by the user ("5-10 years") has been taken into account in identifying responsive results. The search results 354 are ranked, e.g., by indexing/ranking engine 134, from best match down. In this example, the top-ranked result is a "senior software engineer—Company A" position (which may or may not have been normalized "under the hood" to "software engineer"). A desired experience of 7-10 years was explicitly provided when this position was created, and is entirely within the range specified by the user, which may be why this result is the highest ranked responsive position.

The second-ranked result is a "Sr. Software Architect—Company B" position (which may or may not have been normalized "under the hood" to "software engineer"). This position may have been created without an explicit designation of desired experience. Accordingly, a desired experience of 5-10 years has been predicted using techniques described herein, e.g., from a corpus of similar software engineering job postings. The "Experience Required" for this result has been rendered in a visually distinct style from the other results and accompanying text to inform the searching candidate that this desired experience was predicted, not explicitly stated. In this example, the visually distinct style includes bolded and italicized text. However, this is not meant to be limiting. Any number of styles may be applied to render the predicted desired experience more or less conspicuously than other text (e.g., explicitly provided desired experiences), including but not limiting to highlighting, underlining, different font, different font size, dynamic effects (e.g., animation, blinking, etc.), pop-up windows, and so forth.

In addition, in spite of the fact that the second-ranked result more closely matches the candidate's specified experience of "5-10 years," it is ranked lower than the top-ranked result because the desired experience was predicted, not explicitly stated. In other implementations, responsive positions may be ranked without consideration of whether desired experience (or any other candidate qualification) was explicitly stated or predicted. In yet other implementations, responsive positions with predicted desired experiences may be ranked higher than other results with explicitly-stated desired experiences. In yet other implementations, responsive positions for which explicitly-defined desired experiences match predicted experiences may be ranked higher than other responsive positions for which explicitly-defined and predicted desired experiences do not match precisely.

Referring back to FIG. 3, the third ranked result, "Software Engineer—Company C," has an explicitly-stated experience requirement of "8-12" years. In this example, the third ranked result is ranked lower than the other two results because its range only partially overlaps the candidate-specified range of "5-10 years." However, this is not meant to be limiting. For example, the searching candidate may select various search options (not depicted in FIG. 3) that may cause results having explicitly-defined desired experiences to be ranked higher (or lower) than results having predicted desired experiences, regardless of how the ranges overlap with the candidate's specified range. Of course, other signals may be considered when ranking responsive positions, such as how much they overlap a candidate-specified range, how recently the responsive positions were posted, how closely other candidate qualifications (e.g., location, expected salary, multi-lingual capabilities, etc.) associated with the responsive positions match those contained in a candidate's search, attributes known to be associated with the candidate (e.g., via their profile), etc.

Figure 4:
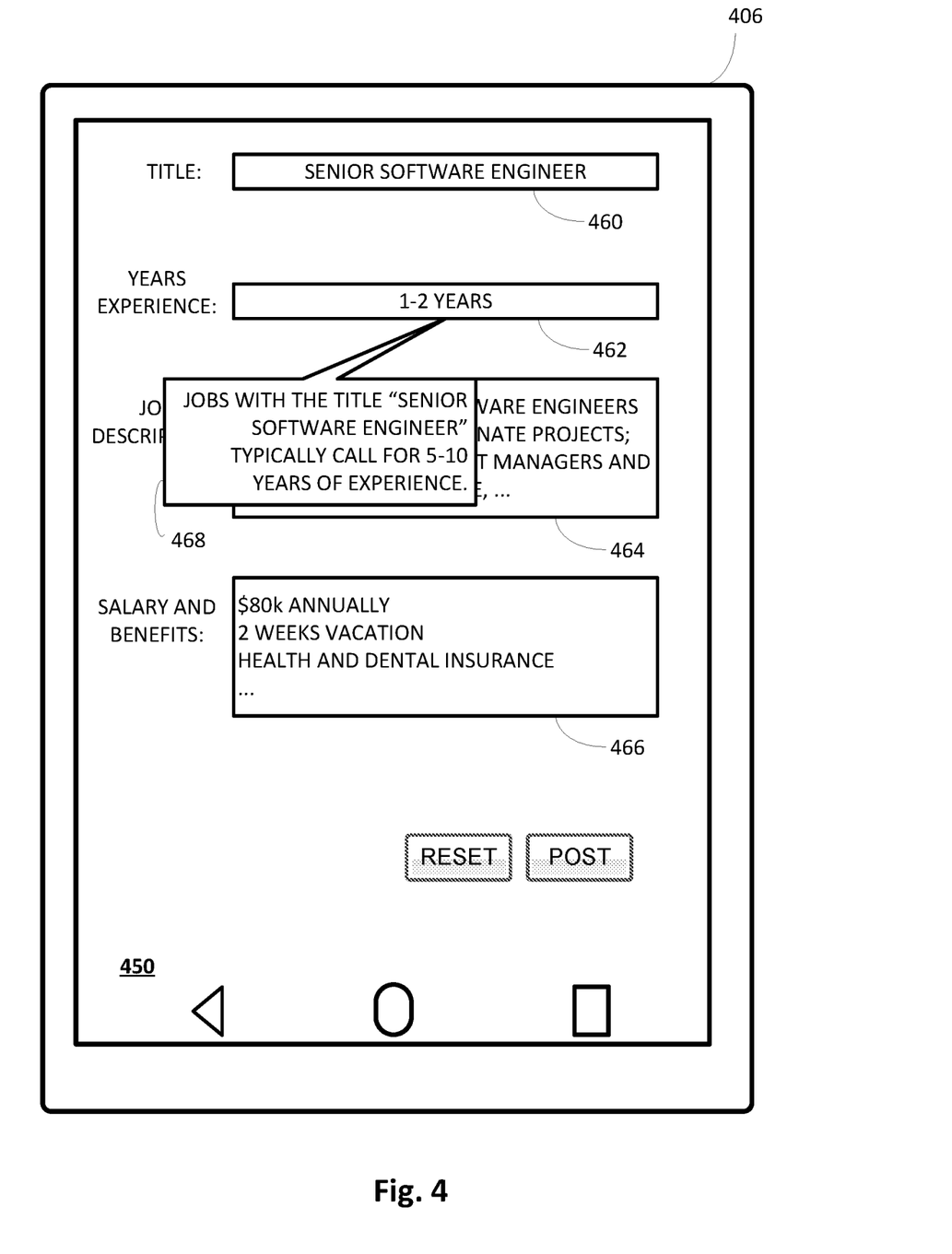
FIG. 4 depicts one example of an interface that may be presented to a user posting a position to fill, in accordance with various implementations.

FIG. 4 depicts one non-limiting example of how techniques described herein may be used to assist a user posting a new position, in accordance with various implementations. In this example, a client device 406 once again takes the form of a tablet computer or smart phone with a touch screen display 450, but other types of computing devices may be used by position-creating users to post new positions to be filled. In this example, the user operates a web-based interface to input the data. However, this is not meant to be limiting. In various implementations, other types of interfaces, such as dedicated application interfaces, may be employed. Additionally or alternatively, a user may provide (e.g., upload) a pre-drafted document (e.g., word processing document, email, etc.) containing a position posting.

The user has entered the Title "Senior Software Engineer" in a first data field 460. In a second data field 462, the user has indicated that 1-2 years of experience are desired/required. In a third data field 464, the user has provided a job description. In a fourth data field 466, the user has provided information about salary and other benefits. These data fields are not meant to be limiting. In other implementations, different data fields, including more or less data fields, may be provided to collect other types of data from the user.

In this example, the user has been presented with a pop up window 468 that informs the user that the years' experience data they provided does not match up to a predicted desired experience for a senior software engineer position. In particular, the user is informed that jobs with the title of "Senior Software Engineer" typically are associated with 5-10 years of experience, rather than the 1-2 years' experience the user provided in second data field 462. Had the user provided a desired experience that corresponded to the predicted desired experience of 5-10 years (e.g., 6-8 years, 5-10 years, etc.), pop up window 468 may or may not have appeared. In various implementations, responding to pop-up window 468 may be optional or required. For example, a user could ignore pop up window 468. Additionally or alternatively, in some implementations, once pop up window 468 appears, the user may be required to adjust the desired experience to comport with predicted desired experience. In yet other implementations, whether a user is required to make an adjustment in response to pop up window 468 may depend on various factors, such as how closely the user's specified desired experience matches the predicted experience. If the user's specified desired experience is relatively close to the predicted desired experience, e.g., within a standard deviation, in some implementations, the user may not be required to adjust the specified desired experience.

A notification such as pop up window 468 may be provided in response to various stimuli. In some implementations, it may be provided in response to the user inputting a job title and then specifying a desired experience that conflicts with a predicted desired experience for the provided job title. In some implementations, pop up window 468 may be provided when the user presses the "POST" interface element, e.g., to ask the user whether they are certain the desired experience they specified is appropriate for the particular position they are posting. In some implementations, pop up window 468 may appear immediately after the user provides a job title, e.g., after the user switches the cursor to another field, so that the user is informed of an appropriate desired experience prior to inputting one. Pop up window 468 or other similar notification elements may be provided using various technologies, such as interpreted languages (e.g., JavaScript) that provide a user-input job title to experience engine 122 and receive a predicted desired experience in response. In some implementations, instead of a pop up window, one or more input fields, such as second data field 462, may be auto-populated with predicted desired experience. The user may or may not alter the auto-populated field as desired, but if the user specifies a desired experience that strays too far from the predicted desired experience, the user may be presented with a notification such as pop up window 468 as described above.

Figure 5:
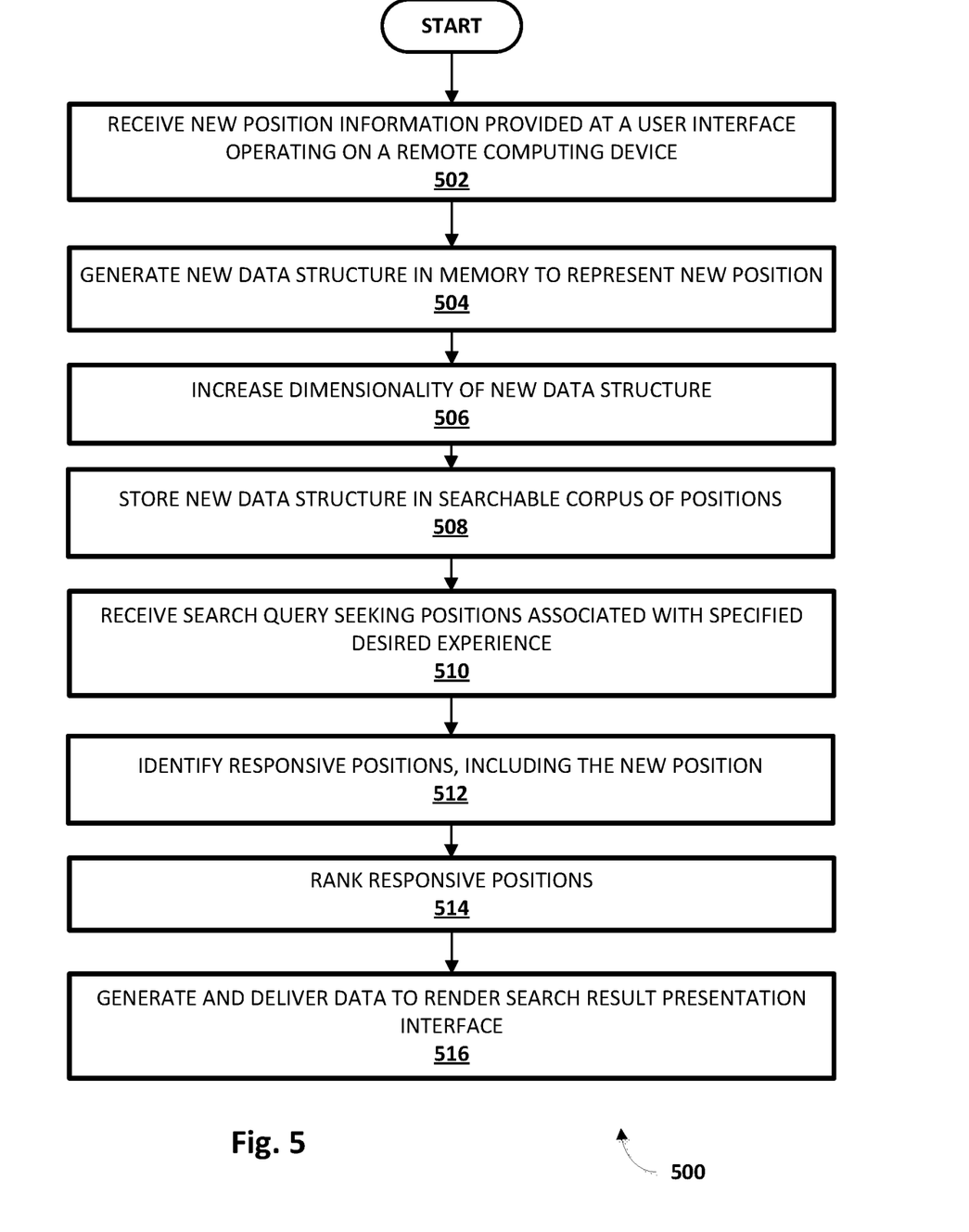
FIG. 5, FIG. 6, and FIG. 7 each depicts a flow chart illustrating an example method in accordance with various implementations.

Referring now to FIG. 5, one example method 500 for practicing various aspects of the present disclosure is described. For convenience, the operations of the flow chart are described with reference to a system that performs the operations. This system may include various components of various computer systems, including various classifiers, engines, and/or client applications described herein. Moreover, while operations of method 500 are shown in a particular order, this is not meant to be limiting. One or more operations may be reordered, omitted or added.

At block 502, the system may receive new position information provided at a user interface operating on a remote computing device (e.g., 106). In various implementations, the new position information may specify one or more candidate qualifications for filling a new position. However, in some instances, the new position information may fail to clearly specify a desired experience, either omitting it altogether or specifying it in a way that is undetectable, e.g., by text-based classifier 120. In some implementations, a user seeking to fill the new position may operate an interface similar to that depicted in FIG. 4 to provide information about the position to be filled. Additionally or alternatively, in some implementations, the user may upload one or more documents (e.g., word processing documents) that contain a description of the position. In the latter case particularly, text-based classifier 120 may be employed to extract various data points from the uploaded document, such as a specified desired experience for filling the position.

Figure 6:
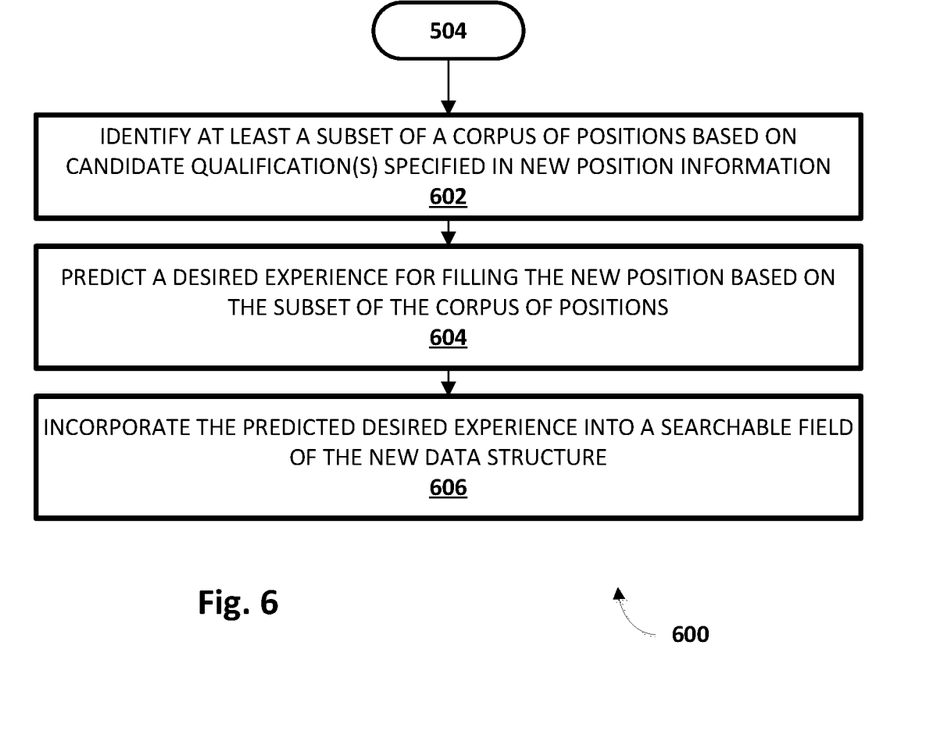

At block 504, the system may generate a new data structure in memory to represent the new position. In some implementations, the new data structure may take the form of one or more database records with one or more fields populated with one or more data points extracted from the new position information. In other implementations, the new data structure may take other forms that may be stored in memory in a manner such that one or more fields of the data structures are searchable. At block 506, the system may increase a dimensionality of the new data structure, e.g., by predicting one or more unspecified data points. A non-limiting example of a method 600 for increasing dimensionality of the new data structure is depicted in FIG. 6.

At block 508, the system may store the new data structure in association with a searchable corpus of positions. In some implementations, the searchable corpus of positions may be the same as (or at least overlap) another corpus of positions that is used to increase the dimensionality of the data structure at block 506 (described below with respect to FIG. 6), and which may include unfilled and/or already filled positions. In other implementations, the searchable corpus of positions may include only unfilled positions.

At block 510, the system may receive, e.g., from a remote computing device operated by a candidate seeking to fill a position, a search query. The search query may specify, among other things, a desired experience. For example, a candidate with seven years of experience in a particular industry may provide a query such as "electrical engineer with 5-10 years' experience." As noted above, various components, such as text-based classifier 120, may extract and/or otherwise manipulate this range as needed to perform a search. At block 512, the system may identify one or more responsive positions, including the new position created at block 504, in the searchable corpus of positions. Unlike the new position created at block 504, some of the other responsive positions may include explicitly-defined (i.e. unpredicted) desired experiences.

At block 514, the system may rank the responsive positions identified at block 512 based on data points such as desired experiences associated with the respective responsive positions. In some implementations, the new position created at block 504 may be ranked lower than one or more other responsive positions based on the one or more other responsive positions being associated with respective desired experiences that are explicitly-defined. In other implementations, the new position may be ranked higher than one or more other responsive positions based on the one or more other responsive positions being associated with respective desired experiences that are explicitly-defined.

At block 516, the system may generate and deliver data (e.g., HTML, XML, CSV, etc.) to render a search result presentation interface on the remote computing device (e.g., 106) operated by the candidate. In various implementations, the search results interface may present the responsive positions in ranked order. In some implementations, the search result presentation interface presents the predicted desired experience associated with the new position created at block 504 (or any other responsive position with a predicted, rather than explicitly-defined, desired experience) in a visually distinct style from one or more explicitly-defined candidate qualifications. For example, and as was depicted in FIG. 2, the predicted desired experience may be presented with a font, font size, or other visual style that is distinct from text conveying explicitly-defined desired experiences associated with other positions.

While not depicted in FIG. 5, in various implementations, a candidate searching for positions to fill may filter results by various candidate qualifications, include desired experience levels that may be explicitly-defined and/or predicted. For example, suppose a candidate is operating a search interface specifically designed for searching positions, as might be provided by a help wanted system. The search interface may include one or more interactive elements that allow the candidate to filter results to various levels of granularity. The candidate may input a textual query and select one or more drop down menus that limit the results to desired experiences (explicit or predicted) to within a particular range. For example, a candidate could select a range of between three and seven years. Any positions in the corpus that otherwise match the candidate's search query, and that include ranges that at least partially (or entirely) overlap the candidate's selected range may be returned. Or, only positions in the corpus that fall entirely within the candidate's specified range may be returned. In various implementations, the candidate may be provided with the ability to select whether his or her specified ranges are exclusive or inclusive.

Referring now to FIG. 6, one example method 600 for increasing a dimensionality of the new data structure generated at block 504 is described. For convenience, the operations of the flow chart are described with reference to a system that performs the operations. This system may include various components of various computer systems, including various classifiers, engines, and/or client applications described herein. Moreover, while operations of method 600 are shown in a particular order, this is not meant to be limiting. One or more operations may be reordered, omitted or added.

From block 504 of method 500, the system may, at block 602, identify at least a subset of a corpus of positions based on one or more candidate qualifications specified in the new position information received at block 502. For example, if the new position information specifies a position title, the corpus of positions may be searched for other positions having the same or similar titles. As noted above, in some implementations, a position title specified in the new position information may be "cleaned" and/or "normalized" (e.g., remove irrelevant information such as location, phrases such as "ready to join a tight-knit team," etc.), so that it is more likely to match up to a greater number of similar positions. And as was noted above, the corpus of positions from which the subset is obtained may be the searchable corpus described above, or another "reference" corpus that may include filled and/or unfilled positions.

At block 604, the system may predict a desired experience for filling the new position based on the subset of the corpus of positions. Suppose the subset contains a plurality of positions similar to the new position. Each position in the subset may include an associated desired experience. While the desired experiences may not be identical across all positions of the subset, the system may nevertheless obtain various statistics about the subset of positions, such as an average desired experience, a median, a mode, a standard deviation, quartiles, etc.

In some implementations, the statistics associated with the subset of positions may have been determined previously, e.g., by experience classifier 122, and stored in index 124, e.g., in association with a normalized position title. In such case, one or more candidate qualifications specified in the new position information, such as a position title, may be normalized (e.g., by text-based classifier 120) and provided as input to experience classifier 122. Experience classifier 122 may then output statistics associated with other similar positions.

At block 606, the desired experience predicted at block 604 may be incorporated into the new data structure generated at block 504 of method 500. For example, a "desired experience" database field associated with the new position may be populated with the predicted desired experience. In some implementations, the database may be indexed by the "desired experience" field, so that a candidate is better able to search by desired experience.

Figure 7:
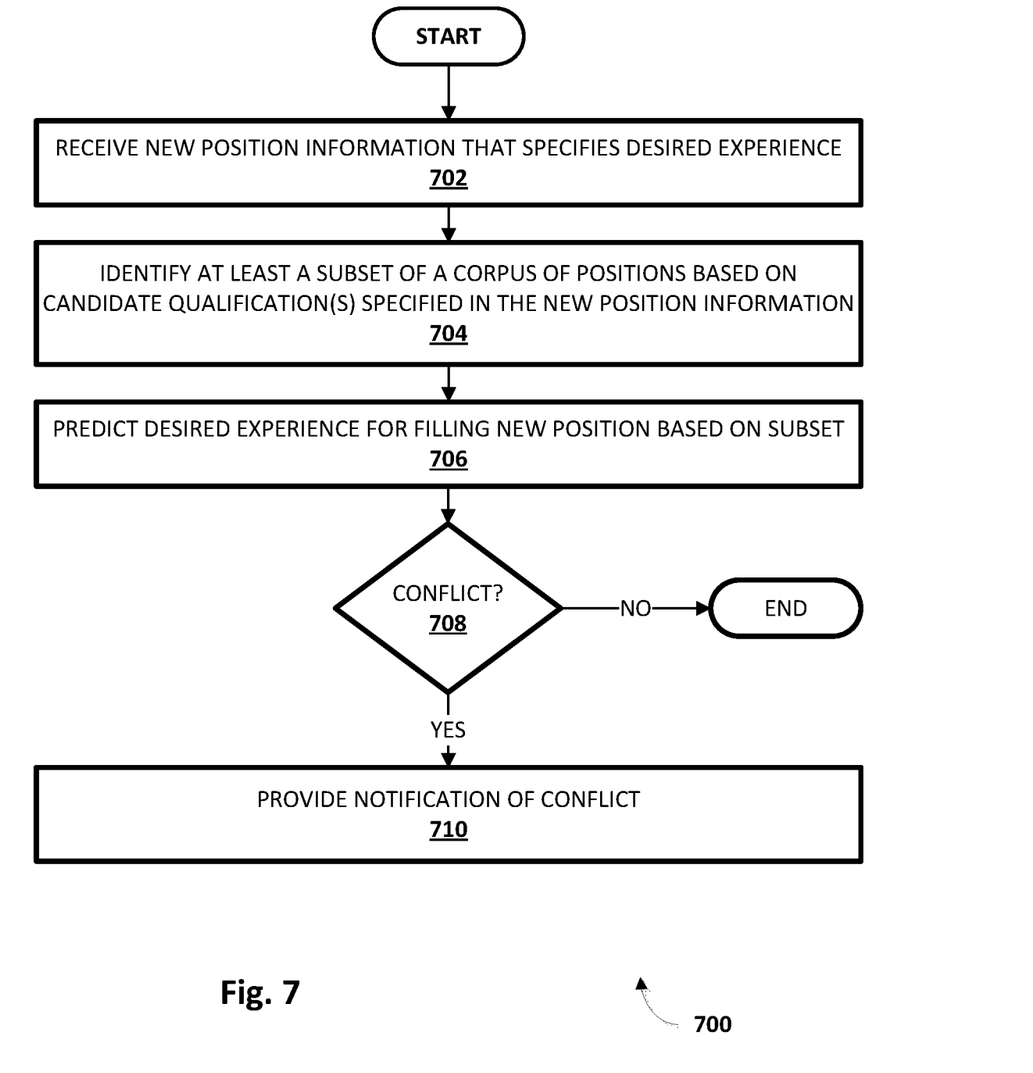

Referring now to FIG. 7, one example method 700 of notifying position creators of conflicts between specified desired experience and predicted desired experience is described. For convenience, the operations of the flow chart are described with reference to a system that performs the operations. This system may include various components of various computer systems, including various classifiers, engines, and/or client applications described herein. Moreover, while operations of method 700 are shown in a particular order, this is not meant to be limiting. One or more operations may be reordered, omitted or added.

At block 702, the system may receive new position information that specifies, among possibly other candidate qualifications, a desired experience. The operations of block 702 otherwise may be similar to those of block 502 of FIG. 5. At block 704, the system may identify (or have previously identified) at least a subset of a corpus of positions based on one or more qualifications specified in the new position information. Based on the subset (and/or on output of experience classifier 122), a predicted experience level may be determined for the new position represented by the new position information. The operations of blocks 704 and 706 may be similar to the operations of blocks 602 and 604 of FIG. 6.

At block 708, the system may compare the explicitly-defined desired experience contained in the new position information (received at block 702) to the predicted desired experience determined at block 706. If these values conflict, method 700 may proceed to block 710 and may provide a notification of the conflict, e.g., such as the pop up window 468 of FIG. 4. As noted above, in some implementations, a user may be free to ignore the notification, while in other implementations, the user may be required to adjust accordingly. If at block 708 it is determined that the values do not conflict, then method 700 may end.

In various implementations, the specified desired experience level and the predicted desired experience level may conflict when, for instance, they do no match, or are not within a predetermined range of each other. In some implementations, if a specified experience range partially overlaps a predicted experience range, they may not conflict. In other implementations, if a specified experience range only partially overlaps a predicted experience range, they may conflict. In some implementations, a standard deviation associated with the predicted desired experience may be used to determine whether the specified desired experience raises a conflict.

While techniques described herein have been primarily focused on predicting desired experiences for position postings, this is not meant to be limiting. Similar techniques may be applied in other scenarios. For example, a candidate creating a resume may utilize an interface similar to that depicted in FIG. 4, except with fields for the candidate to provide information about themselves, a position desired, etc. Additionally or alternatively, the candidate could create a resume as an independent document. Either way, the resume information may be used to predict various data points, such as a level of experience that would be typically associated with the candidate's proposed title. For example, suppose experience classifier 122 is trained on a corpus of resumes (or even a corpus of job postings). When a candidate preparing a resume identifies themselves as a "senior software engineer" and provides a particular amount of experience they have, techniques described herein (e.g., similar to method 700) may be employed to notify the candidate of whether their specified level of experience conflicts with their proposed title. Additionally or alternatively, an entity seeking to fill a position may search and/or filter resumes by candidate experience levels that are both explicitly-defined and predicted.

Figure 8:
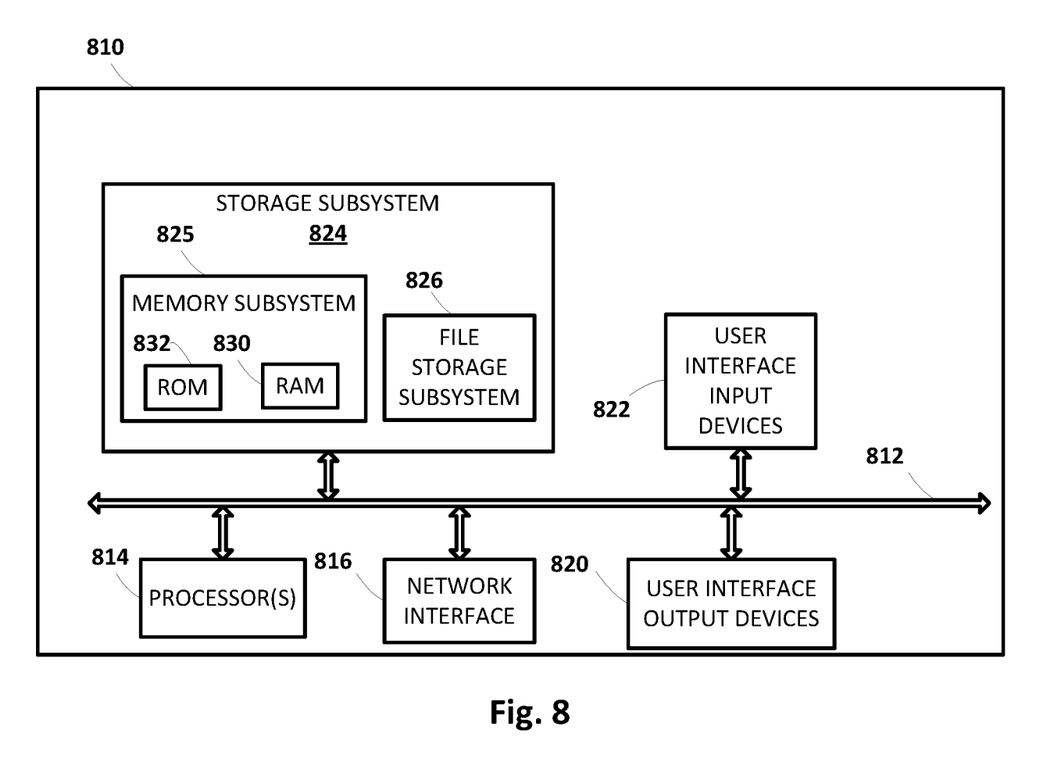
FIG. 8 schematically depicts an example architecture of a computer system.

FIG. 8 is a block diagram of an example computer system 810. Computer system 810 typically includes at least one processor 814 which communicates with a number of peripheral devices via bus subsystem 812. These peripheral devices may include a storage subsystem 826, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides one or more network interfaces to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 826 stores programming and data constructs that provide the functionality of some or all of the modules described herein. For example, the storage subsystem 826 may include the logic to perform selected aspects of methods 500, 600, 700, and/or to implement one or more components of knowledge system 102.

These software modules are generally executed by processor 814 alone or in combination with other processors. Memory 825 used in the storage subsystem 826 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 826, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
receiving new position information provided at a user interface by a user, wherein the new position information specifies candidate qualifications for filling a new position, and wherein the candidate qualifications for filling the new position include a specified desired experience;
storing the new position information in a memory;
identifying at least a subset of a corpus of positions based on at least some of the candidate qualifications;
predicting, using a machine-learned classifier, a desired experience for filling the new position based on the subset of the corpus of positions;
determining that a conflict exists responsive to determining the predicted desired experience is not within a predetermined range of the specified desired experience;
responsive to determining that the conflict exists, storing the predicted desired experience with the new position information, the predicted desired experience being a searchable field for the new position;
receiving a search query seeking positions associated with a given experience;
identifying responsive positions in the corpus of positions based on searchable fields in the corpus based on the given experience, wherein the responsive positions include the new position based at least on the predicted desired experience being responsive to the given experience; and
providing a query response that includes data identifying the responsive positions.

2. The method of claim 1, further comprising causing the user interface to present a notification of the conflict to the user.

3. The method of claim 2, wherein causing the user interface to present the notification of the conflict is responsive to user interface input being directed at a user interface element that is for publicly posting the new position information.

4. The method of claim 2, wherein causing the user interface to present the notification of the conflict is responsive to user interface input that specifies the specified desired experience.

5. The method of claim 1, wherein determining that the predicted desired experience is not within the predetermined range of the specified desired experience includes:

determining that a range of the predicted desired experience and a range of the specified desired experience do not overlap.

6. The method of claim 1, wherein determining that the predicted desired experience is not within the predetermined range of the specified desired experience is based on a standard deviation associated with the predicted desired experience.

7. The method of claim 1, wherein the machine-learned classifier is configured to use a position title, company size, company name, education requirements, or location in making the prediction.

8. The method of claim 1, further comprising:
training the machine-learned classifier using the new position information.

9. The method of claim 1, wherein the subset of the corpus of positions is identified based at least in part on a position title specified in the new position information.

10. A system comprising:
memory storing instructions; and
one or more processors operably coupled to the memory and that execute the instructions to cause the one or more processors to:
receive new position information provided at a user interface by a user, wherein the new position information specifies candidate qualifications for filling a new position, and wherein the candidate qualifications for filling the new position include a specified desired experience;
store the new position information in a memory;
identify at least a subset of a corpus of positions based on at least some of the candidate qualifications;
predict, using a machine-learned classifier, a desired experience for filling the new position based on the subset of the corpus of positions;
determine that a conflict exists responsive to determining the predicted desired experience is not within a predetermined range of the specified desired experience;
responsive to determining that the conflict exists, store the predicted desired experience with the new position information, the predicted desired experience being a searchable field for the new position;
receiving a search query seeking positions associated with a given experience;
identifying responsive positions in the corpus of positions based on searchable fields in the corpus based on the given experience, wherein the responsive positions include the new position based at least on the predicted desired experience being responsive to the given experience; and
providing a query response that includes data identifying the responsive positions.

11. The system of claim 10, wherein the instructions further cause the one or more processors to cause the user interface to present a notification of the conflict to the user.

12. The system of claim 11, wherein in causing the user interface to present the notification of the conflict, the instructions further cause the one or more processors to cause the user interface to present the notification of the conflict responsive to user interface input being directed at a user interface element that is for publicly posting the new position information.

13. The system of claim 12, wherein in determining the predicted desired experience is not within the predetermined range of the specified desired experience, the instructions further cause the one or more processors to:
determine that a range of the predicted desired experience and a range of the specified desired experience do not overlap.

14. The system of claim 12, wherein in determining that the predicted desired experience is not within the predetermined range of the specified desired experience is based on a standard deviation associated with the predicted desired experience.

15. The system of claim 10, wherein the machine-learned classifier is configured to use a position title, company size, company name, education requirements, or location in making the prediction.

16. The system of claim 10, wherein the instructions further cause the one or more processors to:
train the machine-learned classifier using the new position information.

17. The system of claim 10, wherein in identifying the subset of the corpus of positions, the instructions further cause the one or more processors to identify the subset of the corpus of positions based at least in part on a position title specified in the new position information.

18. The system of claim 10, wherein the instructions further cause the one or more processors to:
rank the new position below a first responsive position of the identify responsive positions because the first responsive position has a specified desired experience responsive to the given experience.

19. The system of claim 10, wherein the new position is included in the responsive positions responsive to a comparison of the predicted desired experience with the given experience.

20. The method of claim 1, further comprising:
ranking the new position below a first responsive position of the responsive positions because the first responsive position has a specified desired experience responsive to the given experience.

* * * * *

UNITED STATES PATENT AND TRADEMARK OFFICE
CERTIFICATE OF CORRECTION

PATENT NO. : 11,676,109 B2
APPLICATION NO. : 16/750130
DATED : June 13, 2023
INVENTOR(S) : Posse et al.

Page 1 of 1

It is certified that error appears in the above-identified patent and that said Letters Patent is hereby corrected as shown below:

In the Claims

In Column 18, Line 40, Claim 18, before "responsive" delete "identify".

Signed and Sealed this
Twenty-third Day of July, 2024

Katherine Kelly Vidal
*Director of the United States Patent and Trademark Office*